United States Patent [19]

Korpman

[11] 4,028,292

[45] June 7, 1977

[54] HOT MELT ADHESIVE

[75] Inventor: Ralf Korpman, Somerville, N.J.

[73] Assignee: Johnson & Johnson, New Brunswick, N.J.

[22] Filed: May 23, 1974

[21] Appl. No.: 472,791

[52] U.S. Cl. .................. 260/27 R; 260/45.95 R; 260/27 BB; 260/33.6 AQ; 260/846
[51] Int. Cl.² .......................................... C08L 91/00
[58] Field of Search ............ 260/27 R, 45.95 K, 45, 260/75 W, 33.6 AQ, 846

[56] References Cited

UNITED STATES PATENTS

| 3,239,478 | 3/1966 | Harlan | 260/27 R |
| 3,325,430 | 6/1967 | Grasley | 260/27 BB |
| 3,493,633 | 2/1970 | Lange | 260/45.95 K |

OTHER PUBLICATIONS

Rubber Age, Jan., 1964 (pp. 583 to 589 relief on).

Primary Examiner—Melvyn I. Marquis
Assistant Examiner—William E. Parker

[57] ABSTRACT

A thermoplastic hot melt pressure-sensitive adhesive composition which is resistant to heat deterioration at elevated temperatures and, therefore, may be melted and maintained hot and ready for coating for extended periods of time without detracting from the properties of the adhesive. The composition is based upon a linear or radial A-B-A block copolymer and a mixture of solid and liquid tackifier resins and contains a heat stabilizing component which comprises an oil-soluble, heat-reactive phenol formaldehyde resin and a suitable antioxidant which preferably consists predominantly of a metal dithiocarbamate.

5 Claims, No Drawings

HOT MELT ADHESIVE

The present invention relates to solvent-free thermoplastic hot melt pressure-sensitive adhesive compositions and to normally tacky pressure-sensitive adhesive tapes made therefrom.

In the manufacture of adhesive tapes, hot melt adhesives have been applied to films, paper sheets and other substrates in the form of a liquid melt which solidifies on cooling. The resulting adhesive layer may be either pressure-sensitive or non-pressure-sensitive. In the past, it has been necessary to use only low molecular weight materials in hot melts to assure that the melt composition will have a low enough softening point to allow preparation of the melt and coating of the composition. As a result, prior art hot melt adhesives have possessed very limited performance characteristics even at moderately elevated temperatures. This is particularly true of prior art attempts to produce pressure-sensitive hot melt adhesives which either lacked tack and were not really pressure-sensitive or possessed very low holding properties and low strength at temperatures in the range of 100°- 150° F.

Recent attempts have been made to formulate hot melt pressure-sensitive adhesive utilizing low molecular weight A-B-A block copolymers as generally described in my copending United States Pat. application Ser. No. 407,331, filed Oct. 17, 1973, now U.S. Pat. No. 3,932,328 with improved results. However, in order to obtain proper mixing and coating viscosities, these adhesives must be heated to a relatively high temperature, i.e., 325°- 425° F, and held at this temperature for some period of time depending upon production requirements. Unfortunately this type of adhesive formulation degrades appreciably with time at these temperatures with the result that the hold strength and other performance properties of the coated composition suffer and are reduced. While attempts have been made to stabilize hot melt pressure-sensitive adhesives against degradation by including conventional antioxidants in the formation, this approach also has proven inadequate.

The hot melt pressure-sensitive adhesive formulation of my invention overcomes these problems. I have discovered that a marked improvement in the heat stability of hot melt pressure-sensitive adhesive base upon A-B-A block copolymers can be obtained by the inclusion of a relatively small amount of a particular type of an essentially non-catalyzed heat stabilizing component in a formulation which also depends on a mixture of normally solid and liquid tackifier resins. Surprisingly, if only about 1–5 percent of an oil soluble heat-reactive phenol formaldehyde resin, by weight of the adhesive composition is added to the hot melt along with at least about 0.5 percent by weight of the adhesive composition, preferably about 0.5–2 percent, of a suitable antioxidant, good heat stability of the melt can be maintained for eight hours or more at temperatures in the neighborhood of 350° F. and over. This allows the hot melt composition to be melted and mixed hot and then maintained as a hot melt ready for coating for a full production shift if necessary.

In general, when I refer to maintaining the heat stability of these hot melt compositions, I am thinking of minimizing the degradation of the adhesive which otherwise would occur at high temperatures. To regulate this I measure the Brookfield Viscosity of the adhesive to record any changes which occur in this viscosity over a period of time, such as eight hours as indicated above. For the purposes of this invention, the hot melt composition is deemed to have satisfactory heat stability if its Brookfield Viscosity decreases less than 50 percent in the period from the third through the eighth (3–8) hours during the eight hour period following mixing wherein the formulation is exposed continuously to a temperature of about 350° F. Preferably, the viscosity of the adhesive will decrease less than 50 percent during the whole 8 hour period. However, this change sometimes is difficult to measure since the initial viscosity varies appreciably and it is believed that it takes two or three hours to reach a uniform temperature in the system.

In practice, the optimum proportions of the ingredients of the heat stabilizing component of the adhesive of this invention will be selected to correspond with the nature and amounts of the elastomeric component, i.e., the block copolymer ingredient, and the tackifying component. For instance, when a relatively low amount of the tackifying component is used only about 1–2 percent of the phenolic resin by weight of the composition may be desirable whereas if as much as 300 parts of the tackifying component per 100 parts of the elastomer is used, about 3 – 5 percent of the phenolic resin may be desirable. These relationships between the various components of the adhesive of this invention will be illustrated further in the following examples.

In this connection, it has been determined that the relative proportions of all of these ingredients may be carefully selected to assure that the Brookfield Viscosity of the composition decreases very little, say less than 5 or 10 percent in the initial 8 hour period during which it is exposed to a temperature of about 350° F.

The hot melt adhesive of my invention comprises an elastomeric component which includes a major amount of the above described A-B-A block copolymer, about 125 – 300 parts per weight of this elastomeric component of a tackifying component which consists of a mixture of normally solid and liquid tackifiers as described in more detail hereinafter, and a relatively small amount of an essentially noncatalyzed heat stabilizing component of the type described above which is a mixture of an oil-soluble heat-reactive phenol formaldehyde resin and antioxidant of the type described hereinafter, in the proportions indicated. When the term "essentially non-catalyzed" is used to describe the heat stabilizing component of the adhesive of this invention, it means that this component does not contain a catalyst or accelerator for the purpose of promoting a reaction between the block copolymer and the oil-soluble heat-reactive phenolic resin when heated and that the adhesive composition is essentially neutral or free of acidic or basic accelerators. Surprisingly, it has been observed that the addition of certain catalysts actually detracts from the heat stabilizing effect.

The A-B-A block copolymers useful in the elastomeric component of this invention may be linear or radial A-B-A block copolymer comprises an elastomeric B-block (center block) derived from a conjugated diene such as butadiene or isoprene, i.e. polymerized from butadiene, isoprene or the like, either alone or in conjunction with a small proportion of other monomers; and thermoplastic A-blocks (end blocks) derived from styrene, i.e., polymerized from styrene or styrene homologues. The individual A- blocks have a number average molecular weight of at least about 7,000 preferably in the range of about 12,000 – 30,000, and the A-blocks constitute about 10–50 and preferably about 12–25 percent by weight of the block copolymer.

The radial polymers useful in this invention are of the type described in U.S. Pat. No. 3,281,383 and conform to the following general formula: $(A-B-)_nX$, wherein A is a thermoplastic block polymerized from styrene or styrene homologues, B is an elastomeric block polymerized from a conjugated diene such as butadiene or isoprene, X is an organic or inorganic connecting molecule with a functionality of 2–4 as described in U.S. Pat. No. 3,281,383, and $n$ is a number from 2–4. Thus, when n=2, X can be the same as B.

The above described A-B-A block copolymers may be used as the sole elastomeric constituent of the adhesive, and it is preferred that the elastomeric component consist essentially of this type of block polymer. However, the elastomeric component of the adhesive may include a minor proportion by weight of an additional more conventional diene elastomer such as natural rubber, or polymers based on butadiene, isoprene, butadiene-styrene (SBR rubber), butadiene-acrylonitrile (NBR rubber), butyl rubber or the like, and also may include other blocks polymers based on such diene elastomers.

According to my invention, the solid and liquid tackifier resins are blended in such a way that the proportion of solid to liquid tackifiers in the tackifier component ranges between about 4 to 1 and 1 to 3, preferably 2.5 to 1 and 1 to 1. Solid tackifier resins are those which are friable or brittle at room temperature, i.e., about 25° C., and normally have softening points above about 60° C., whereas liquid tackifier resins are liquid at room temperature, or about 25° C., under otherwise normal ambient conditions. Preferably, the solid tackifier resins possess a number average molecular weight above about 900 and the liquid tackifier resins possess a number average molecular weight below about 700.

Liquid tackifier resins for the purposes of this invention are material generally selected from the group consisting of liquid hydrocarbon resins, liquid polyterpenes, liquid rosin esters, liquid polystyrene resins, and the like. The solid tackifier resins are of the type listed in Column 5 of the U.S. Pat. No. 3,239,478 and include rosin and rosin derivatives, polyterpenes, coumarone indenes, hydrocarbon resins, and the like. In this connection, it should be noted that the rosin esters listed in that patent are solids as are all of the tackifier resins referred to therein.

A preferred tackifier component according to this invention comprises a blend of similar solid and liquid hydrocarbon resins of a particular type. These preferred resins are polymerized from a stream of aliphatic petroleum derivatives in the form of dienes and mono-olefins having 5 or 6 carbon atoms generally in accordance with the teachings of U.S. Pat. No. 3,577,398. The resulting solid hydrocarbon resin consists essentially of polymerized structures derived from these aliphatic dienes and mono-olefins of 5 or 6 carbon atoms and since the dienes are more reactive, at least 40 percent by weight and preferably a major proportion of said structures are derived from the dienes. In this type of resin, the dienes are piperylene and/or isoprene. However, in some formulations, the percentage of isoprene is extremely low. In the solid resin of this embodiment the molecular weight may range between about 900 and 1300 with the man number average molecular weight being about 1100. This solid resin also has a softening point in the neighborhood of 100° C. In one preferred form, i.e., Wingtack 95 offered by Goodyear Chemical Company, the softening point is 95° C.

The preferred liquid hydrocarbon tackifier resin of this embodiment of the invention also consists essentially of polymerized structures derived from aliphatic dienes and mono-olefins of 5 or 6 carbon atoms, at least 40 percent by weight and preferably a major proportion of which are derived from piperylene or from piperylene and isoprene. However, this resin is liquid at 25° C. and has a number average molecular weight of about 500°–600, i.e., Wingtack 10, referred to hereinafter in the Examples, has a number average molecular weight of 530. This liquid resin also contains a higher percentage of structures derived from the dienes piperylene and/or isoprene, i.e., in the neighborhood of 75 percent or more by weight of the resulting resin. Similarly, in the liquid resin, the amount of unsaturation is considerably higher. For instance, with the unsaturation expressed in percentage of polymerized units in each molecule having a double bond as compared with the total number of units in a molecule, the solid resin normally only will have about 10–15 percent or slightly more unsaturation, whereas the liquid resin may have over 25 percent unsaturation.

As indicated hereinbefore, the essentially non-catalyzed heat stabilizing component of this invention comprises about 1–5 percent of an oil-soluble heat-reactive phenol formaldehyde resin and at least about 0.5 percent, preferably 0.5–2 percent, of a suitable antioxidant, both by weight of the adhesive composition.

The oil-soluble heat-reactive phenol formaldehyde resins referred to are made by the reaction of a bifunctional phenol, i.e., an ortho or para-substituted phenol, with formaldehyde under alkaline conditions normally in the presence of water. After the proper reaction time, the solution may be neutralized so that the resin precipitates from the solution and may be dried. The phenol may be alkyl or aryl substituted although higher alkyl substitution is preferred. The preferred phenols are the higher para-alkyl phenols such as para-butyl, octyl or nonyl phenol. Preferably the alkyl group is branched. Typical phenols of this invention based on para-butyl and para-octyl phenol are given in the following examples.

Various antioxidants may be suitable for use in the heat stabilizing component of this invention. Preferably, at least the major proportion of the antioxidant is a metal dithiocarbamate, i.e., a metallic salt of an alkyl, or dialkyl dithiocarbamate such as zinc dibutyl dithiocarbamate. Antioxidants of this type may be used alone or with other conventional antioxidants such as phenolic antioxidants. The combination of zinc dibutyl dithiocarbamate and 1,3,5-trimethyl-2,4,6-tris (3,5-ditertiary butyl-4-hydroxy phenyl) benzene, offered commercially by the Ethyl Corporation as Ethyl 330, has been found to give exceptionally good results.

Other conventional ingredients may be added so long as they do not generally affect the alkalinity or acidity of the system. Inert fillers such as silicas, clays, aluminum hydrate and the like may be used. Plasticizers also may be used to supplement or partially replace the liquid portion of the resin.

There are various methods of mixing the ingredients of the hot melt pressure-sensitive adhesive composition of this invention and coating the composition onto a flexible backing to form a pressure-sensitive adhesive tape. Since the block copolymer of this invention in its preferred form, is particulate, one method is to thoroughly blend the dry block polymer particles with the solid tackifier resin particles, charge the dry blend into the inlet of an extruder and then pump the liquid tackifier into the barrel where the formulation will be completely mixed. The opposite approach is to form a hot melt of the solid and liquid resins, i.e., to melt the solid resin particles with the liquid resins and maintain the melt at a temperature of approximately 350° F., and then add the block copolymer in form of small particles which are thoroughly mixed in the resin melt. Similarly, the solid and liquid resins may be melted together or preblended and then solidified and stored or shipped as whether or not the adhesive formulation is coated on the backing directly after mixing or several hours later. This allows the consistent production of quality adhesive products. Other and further advantages of this invention will appear to one skilled in the art from the following examples and claims.

The following examples are given only by way of illustration and are not intended to limit the scope of the invention in any way. Table A gives the adhesive formulations for Examples I – VIII and viscosity data on these formulations to indicate their resistance to deterioration at relatively high temperatures. In the Examples, all proportions are given in parts per 100 parts by weight of the elastomeric component unless otherwise shown. In the following Examples the elastomeric component is the total of the block copolymers.

TABLE A

| Ingredients and Properties | I | II | III | IV | V | VI | VII | VIII |
|---|---|---|---|---|---|---|---|---|
| Kraton 1107 Linear Block Copolymer | 100 | 100 | 100 | 100 | 100 | 100 | 100 | 75 |
| Solprene 411 Radial Block Copolymer | — | — | — | — | — | — | — | 25 |
| Wingtack 95 Solid Tackifier Resin | 120 | 120 | 120 | 120 | 120 | 120 | — | 140 |
| Wingtack 10 Liquid Tackifier Resin | 50 | 50 | 50 | 50 | 50 | 50 | 300 | 50 |
| Amberol ST-137 Phenolic Resin | 5 | 4 | 3 | 4 | — | — | 15 | 3 |
| Schenectady CRJ-352 Phenolic Resin | — | — | — | — | 4 | — | — | — |
| Schenectady SP-1045 Phenolic Resin | — | — | — | — | — | 4 | — | — |
| Zinc Dibutyl Dithiocarbamate (Antioxidant) | 2 | 2 | 2 | 2 | 2 | 2 | 2 | 2 |
| Ethyl 330 Antioxidant | 1 | 1 | 1 | — | 1 | 1 | 1 | 1 |
| % Phenolic Resin (by weight of composition) | 1.80 | 1.44 | 1.09 | 1.45 | 1.44 | 1.44 | 3.59 | 1.01 |
| % Antioxidants (by weight of composition) | 1.08 | 1.08 | 1.09 | .72 | 1.08 | 1.08 | .72 | 1.01 |
| Brookfield Viscosity after 1 hour at 350° F, cps. | 53,500 | 44,000 | 44,000 | 53,000 | 59,000 | 55,000 | 2,000 | 33,000 |
| after 3 hours | 56,000 | 44,000 | 35,000 | 49,000 | 52,000 | 52,000 | 1,500 | 27,000 |
| after 8 hours | 53,000 | 32,500 | 20,000 | 29,000 | 46,000 | 43,000 | 1,000 | 20,000 |
| % Change in Viscosity 1 – 8 hours | 0.9 | 26 | 55 | 45 | 22 | 22 | 50 | 39 |
| % Change in Viscosity 3 – 8 hours | 5 | 26 | 43 | 41 | -12 | 17 | 33 | 26 | a preblend of the solid and liquid resins. The blend then can be remelted to allow the blocks copolymer to be added. Another method is merely to place all the ingredients in a vessel and heat the contents at a low temperature, i.e., about 200° F. for 24 hours. At the end of the 24 hour period the temperature of the ingredients can be raised to approximately 350° F. to reduce their viscosity and allow them to be stirred to form a thorough mixture in accordance with this invention. Regardless of the method chosen, the ingredients of the heat stabilizing component should be thoroughly mixed into the melted composition prior to the time the composition is allowed to stand for any length of time at coating temperatures, i.e., above 300° F.

Similarly, there are a number of methods which may be employed to coat the resulting hot melt pressure-sensitive adhesive composition onto a flexible backing sheet to form a pressure-sensitive sheet or tape. For instance, a variety of coating techniques may be used. A hot roller or rod may be employed in place of a conventional blade in the so-called knife coating process. However, a preferred technique is to pump the hot melt composition through a hot die and then draw the sheet across or past the die to pick up an adhesive layer of the desired weight or thickness. Generally speaking, the amount of adhesive applied to the sheet by this technique will depend upon the adhesive through-put rate and the speed of the sheet passing the die.

The resulting pressure-sensitive adhesive coated sheets and tapes of this invention possess relatively predictable adhesive properties as compared with hot melt adhesive products which do not possess the heat stability of this invention. Thus, adhesive tapes of this invention will perform satisfactorily regardless of In mixing the adhesive of Examples I–VIII, all of the ingredients except the block copolymers are melted at about 350° F. and stirred together for about 1 hour to form a melt. Then the pulverized block copolymer gradually is stirred into the melt and stirring is continued for approximately 1–2 hours to completely dissolve the block copolymer. The melt then is laid down on a conventional release paper and cooled. Viscosity is measured to provide the data given in Table A by chopping portions of the cooled melt for each formulation into small pieces and dropping them into the heated vessel of a Model L.V.F. Brookfield Viscometer. Addition of the proper amount of material may take 15 minutes. The Viscometer then is operated at 6 r.p.m. using a No. 4 spindle and a Thermosel heater to maintain the temperature at 350° F., and viscosity measurements are taken for each sample commencing with the period of 1 hour following the beginning of addition as indicated.

It will be seen that the percentage change in viscosity during the period of 3–8 hours following the beginning of addition is less than 50 percent for each of the Examples. Examples 1, 5, and 6 illustrates that the percentage change may be minimized by approaching the optimum combination of ingredients and proportions. When these adhesive compositions are coated any time within 8 hours following mixing they will maintain their basic characteristics and, in particular, not suffer any loss in performance characteristics at elevated temperatures due to adhesive deterioration while melted prior to coating.

Kraton 1107 copolymer is a thermoplastic elastomeric A-B-A block copolymer of this invention offered by the Shell Chemical Company, wherein the styrene content (that of the A blocks) is about 12–15 percent, closer to 15 percent by weight of the block copolymer, and the polymer possesses a solution viscosity of about 2000 centipoises at 25 percent solids in toluene at room temperature (using a Brookfield Viscometer with a No. 4 spindle at 60 r.p.m.), and a number average molecular weight of about 110,000 – 125,000.

Solprene 411 copolymer is a radial butadiene-styrene thermoplastic elastomeric A-B-A block copolymer of the type described in U.S. Pat. No. 3,281,383, referred to hereinbefore. This copolymer contains approximately 30 percent styrene and has a Brookfield Viscosity of about 30 cps. at 5 percent solids in toluene and is offered commercially by the Phillips Petroleum Company.

Wingtack 95 resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12–15 percent unsaturation based upon percentage of units in each molecule having a double bond. The said resin is polymerized from a stream of aliphatic petroleum derivatives in the form of dienes and monoolefins having 5 or 6 carbon atoms all in accordance with the general teachings of the aforesaid U.S. Pat. No. 3,577,398. This resin possesses a softening point of about 95° C. by the ball and ring method, a number average molecular weight of about 1100 and is offered commercially by Goodyear Tire and Rubber Company.

Wingtack 10 resin is a liquid tackifier resin also consisting predominantly, i.e., about 75 percent, of polymerized structures derived from piperylene and isoprene. However, this resin is liquid at 25° C. and has a number average molecular weight of about 530. It also appears to have at least about 25 percent unsaturation, as explained hereinbefore. It also contains a lesser percentage of structures derived from mono-olefins and is offered commercially by Goodyear Tire and Rubber Company as liquid Wingtack Resin.

Amberol ST-137 is heat reactive octyl phenol formaldehyde resin with a number average molecular weight of about 875 and having a methylol titration of about 9.7 percent. It is sold commercially be Rohm and Haas Company.

Schenectady SP-1045 is a heat reactive butyl phenol formaldehyde resin with a number average molecular weight of about 1190 and having a methylol titration of about 6 percent. Schenectady CRJ-352 is a heat reactive octyl phenol formaldehyde resin with a number average molecular weight of about 950 and having a methylol titration of about 1.7 percent. The latter two resins are sold by Schenectady Chemical Company.

As indicated hereinbefore, Ethyl 330 is a commercial antioxidant sold by the Ethyl Corporation and is reported to be 1,3,5-trimethyl-2,4,6-tris(3,5-ditertiary butyl-4-hydroxy phenyl) benzene.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A thermoplastic hot melt pressure-sensitive adhesive composition which comprises an elastomeric component comprising a major amount by weight of said component of a linear or radial elastomeric and thermoplastic A-B-A block copolymer wherein B is an elastomeric polymer block derived from a conjugated diene and A is a thermoplastic polymer block derived from styrene or a styrene homologue and said A blocks constitute about 10–50 percent by weight of the block copolymer; about 125–300 parts by weight of the elastomeric component of a tackifying component consisting essentially of a blend of normally solid and liquid tackifier resins, the proportion of solid resin to liquid resin in the blend being between about 4 to 1 and 1 to 3, said solid resins being normally friable at about 25° C. and said liquid resins being in a liquid state at about 25° C.; and an essentially non-catalyzed heat stabilizing component comprising about 1-5 percent by weight of the adhesive composition of an oil-soluble heat-reactive phenol formaldehyde resin and at least about 0.5 percent by weight of the composition of an antioxidant therefor.

2. A pressure-sensitive adhesive composition according to claim 1, which comprises about 0.5–2 percent of the antioxidant by weight of the adhesive composition.

3. A pressure-sensitive adhesive composition according to claim 1, wherein said antioxidant comprises a metal dithiocarbamate.

4. A pressure-sensitive adhesive composition according to claim 3, wherein said dithiocarbamate constitutes a major proportion of the antioxidant and said antioxidant also comprises 1,3,5-trimethyl-2,4,6-tris(3,5di-tertiary butyl-4hydroxy phenyl) benzene.

5. A pressure-sensitive adhesive composition according to claim 4, wherein said dithiocarbamate is a zinc dialkyl dithiocarbamate.

* * * * *

UNITED STATES PATENT AND TRADEMARK OFFICE
CERTIFICATE OF CORRECTION

PATENT NO. : 4,028,292
DATED : June 7, 1977
INVENTOR(S) : Ralf Korpman

It is certified that error appears in the above-identified patent and that said Letters Patent are hereby corrected as shown below:

In Column 1, line 26, "adhesive" should read --- adhesives ---.

In Column 1, line 42, "formation" should read --- formulation ---.

In Column 1, line 47, "adhesive" should read --- adhesives ---.

In Column 3, line 25, "blocks" should read --- block ---.

In Column 3, line 41, "material" should read --- materials ---.

In Column 4, line 14, "500°" should read --- 500 ---.

In Column 6, line 34, "adhesive" should read --- adhesives ---.

In Column 7, line 44, "be" should read --- by ---.

In Column 8, line 47, "butyl-4hydroxy" should read --- butyl-4-hydroxy ---.

Signed and Sealed this

Thirteenth Day of June 1978

[SEAL]

Attest:

RUTH C. MASON
Attesting Officer

DONALD W. BANNER
Commissioner of Patents and Trademarks